(12) United States Patent
Faler et al.

(10) Patent No.: US 6,291,564 B1
(45) Date of Patent: Sep. 18, 2001

(54) AQUEOUS COATING COMPOSITIONS, COATED SUBSTRATE AND METHOD RELATED THERETO

(75) Inventors: Dennis L. Faler, Pittsburgh, PA (US); Djurdjica Glas, Stuttgart (DE); Hans-Dieter Hille, Bergisch Gladbach (DE); Michael Jäger, Bornheim (DE); Walter Metzger, Denkendorf (DE); Kurt G. Olson, Gibsonia, PA (US); Edward S. Pagac, Portersville, PA (US); Daniel E. Rardon, Gibsonia, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/250,671

(22) Filed: Feb. 16, 1999

Related U.S. Application Data
(60) Provisional application No. 60/075,030, filed on Feb. 18, 1998.

(51) Int. Cl.$^7$ ................. C08J 3/00; C08K 5/09; C08K 5/10; C08K 5/16; C08L 67/00
(52) U.S. Cl. .............. 524/284; 523/412; 523/501; 523/508; 524/198; 524/199; 524/318
(58) Field of Search ................. 523/501, 508, 523/412; 524/284, 318, 198, 199

(56) References Cited

U.S. PATENT DOCUMENTS

| | | | |
|---|---|---|---|
| Re. 33,008 | 8/1989 | Ruffner et al. | 526/270 |
| 3,684,759 | 8/1972 | Reiff et al. | 260/29.6 NR |
| 4,070,323 | 1/1978 | Vanderhoff et al. | 260/29.6 NR |
| 4,271,051 | 6/1981 | Eschwey | 260/22 M |
| 4,335,029 | 6/1982 | Dabi et al. | 524/589 |
| 4,451,596 | 5/1984 | Wilk et al. | 523/501 |
| 4,616,074 | 10/1986 | Ruffner | 526/318 |
| 4,719,132 | 1/1988 | Porter, Jr. | 427/409 |
| 4,791,168 | 12/1988 | Salatin et al. | 524/601 |
| 4,851,460 | 7/1989 | Stranghöner et al. | 523/407 |
| 5,015,688 | 5/1991 | Bederke et al. | 524/600 |
| 5,026,818 | 6/1991 | Heinz et al. | 528/313 |
| 5,071,904 | 12/1991 | Martin et al. | 524/458 |
| 5,098,947 | 3/1992 | Metzger et al. | 524/507 |
| 5,136,004 | 8/1992 | Bederke et al. | 526/273 |
| 5,155,163 | 10/1992 | Abeywardena et al. | 524/591 |
| 5,342,882 | 8/1994 | Göbel et al. | 524/832 |
| 5,354,807 | 10/1994 | Dochniak | 524/591 |
| 5,356,973 | 10/1994 | Taljan et al. | 524/314 |
| 5,368,944 | 11/1994 | Hartung et al. | 428/423.1 |
| 5,401,790 | 3/1995 | Poole et al. | 524/199 |
| 5,412,023 | 5/1995 | Hille et al. | 524/539 |
| 5,459,197 | 10/1995 | Schwindt et al. | 524/591 |
| 5,460,892 | 10/1995 | Bederke et al. | 428/482 |
| 5,468,802 | 11/1995 | Wilt et al. | 524/539 |
| 5,554,686 | 9/1996 | Frisch, Jr. et al. | 524/588 |
| 5,589,534 | 12/1996 | Metzger et al. | 524/548 |
| 5,614,584 | 3/1997 | Schwan et al. | 524/591 |
| 5,635,559 | 6/1997 | Brock et al. | 524/839 |
| 5,646,214 | 7/1997 | Mayo | 525/10 |
| 5,648,410 | 7/1997 | Hille et al. | 523/501 |
| 5,684,072 | 11/1997 | Rardon et al. | 524/199 |
| 5,698,330 | 12/1997 | Bederke et al. | 428/423.1 |
| 5,703,155 | 12/1997 | Swarup et al. | 524/558 |
| 5,741,552 | 4/1998 | Takayama et al. | 427/407.1 |
| 5,759,694 | 6/1998 | Mayo et al. | 428/423.1 |
| 5,814,410 | 9/1998 | Singer et al. | 428/423.1 |
| 5,925,698 | 7/1999 | Steckel | 524/322 |

FOREIGN PATENT DOCUMENTS

| | | |
|---|---|---|
| 2627320 | 12/1977 | (DE) . |
| 0069839 | 1/1983 | (EP) . |
| 0038127 | 10/1984 | (EP) . |
| 0210747 | 2/1987 | (EP) . |
| 0238166 B1 | 9/1991 | (EP) . |
| 0567214 A1 | 10/1993 | (EP) . |
| 0238166 B2 | 9/1994 | (EP) . |
| 0794212 | 9/1997 | (EP) . |
| 1579672 | 11/1980 | (GB) . |
| WO94/05733 | 3/1994 | (WO) . |
| WO 95/07951 | 3/1995 | (WO) . |
| WO95/27013 | 10/1995 | (WO) . |
| WO97/30097 | 8/1997 | (WO) . |

OTHER PUBLICATIONS

J. Nelson et al., "Castor–Based Derivatives: Synthesis of Some Acrylate Esters", J. Am. Oil Chem Society 43 (9) 1966 pp. 542–545.
English Abstract for EP 69839.

*Primary Examiner*—Patrick D. Niland
(74) *Attorney, Agent, or Firm*—Jacques B. Miles

(57) ABSTRACT

An aqueous coating composition is provided which includes crosslinkable film-forming resin and about 0.01 to about 25 weight percent on a basis of total resin solids of an amphiphilic adjuvant having an acid value of less than 30, a water-soluble polar end including at least one terminal hydroxyl group and a water-insoluble hydrocarbon end including at least seven contiguous carbon atoms. The coating composition is useful as a monocoat or primer, basecoat or clearcoat in a multi-component composite coating composition for automotive applications.

25 Claims, No Drawings

AQUEOUS COATING COMPOSITIONS, COATED SUBSTRATE AND METHOD RELATED THERETO

CROSS-REFERENCE TO RELATED APPLICATION

This patent application is related to provisional U.S. patent application Ser. No. 60/075,030 entitled "Low Temperature Cure Waterborne Coating Compositions Having Improved Appearance And Humidity Resistance", filed Feb. 18, 1998.

FILED OF THE INVENTION

The present invention relates to aqueous coating compositions and, more particularly, to their use in multi-component composite coating compositions as primers, pigmented or colored basecoats and/or transparent topcoats which provide good smoothness and appearance in automotive coating applications.

BACKGROUND OF THE INVENTION

Over the past decade, there has been a concerted effort to reduce atmospheric pollution caused by volatile solvents which are emitted during the painting process. However, it is often difficult to achieve high quality, smooth coating finishes, such as are required in the automotive industry, without using organic solvents which contribute greatly to flow and leveling of a coating.

One of the major goals of the coatings industry is to minimize the use of organic solvents by formulating waterborne coating compositions which provide a smooth, high gloss appearance, as well as good physical properties including resistance to acid rain. Unfortunately, many waterborne coating compositions, particularly those containing metallic flake pigments, do not provide acceptable appearance because they deposit as a rough film under conditions of low humidity. Although smooth films can be obtained if the humidity is controlled within narrow limits, this often is not possible in industrial applications without incurring considerable expense.

Therefore, it would be desirable to provide a waterborne coating composition which is useful as an original finish for automobiles and which can be applied as a smooth film under a variety of humidity conditions.

SUMMARY OF THE INVENTION

The present invention provides an aqueous coating composition comprising: (a) at least one crosslinkable film-forming resin; and (b) at least one amphiphilic adjuvant comprising: a water-soluble polar end comprising at least one terminal hydroxyl group; and a water-insoluble hydrocarbon end comprising at least seven contiguous carbon atoms, the adjuvant having an acid value of less than 30 and being present in an amount ranging from about 0.01 to about 25 weight percent on a basis of total resin solids of the aqueous coating composition, the film-forming resin and adjuvant being present in an aqueous medium.

Another aspect of the present invention is a multi-component composite coating composition comprising a basecoat deposited from an aqueous basecoat coating composition and a transparent topcoat applied over the basecoat in which the transparent topcoat is deposited from a topcoat coating composition, the basecoat coating composition comprising: (a) at least one crosslinkable film-forming resin; and (b) at least one amphiphilic adjuvant comprising: a water-soluble polar end comprising at least one terminal hydroxyl group; and a water-insoluble hydrocarbon end comprising at least seven contiguous carbon atoms, the adjuvant being present in an amount ranging from about 0.01 to about 25 weight percent on a basis of total resin solids of the basecoat coating composition. A substrate having a surface coating of the above multi-component composite coating composition is also provided.

Another aspect of the present invention is a method for increasing the surface tension of a basecoat in a multi-component composite coating composition comprising the steps of depositing an aqueous basecoat coating composition comprising at least one crosslinkable film-forming resin to form a crosslinked basecoat and applying a topcoat coating composition over the basecoat to form a transparent topcoat thereon, wherein the improvement comprises: the basecoat coating composition further comprising at least one amphiphilic adjuvant comprising: a water-soluble polar end comprising at least one terminal hydroxyl group; and a water-insoluble hydrocarbon end comprising at least seven contiguous carbon atoms, the adjuvant being present in an amount ranging from about 0.01 to about 25 weight percent.

DETAILED DESCRIPTION OF THE PREFERRED EMBODIMENTS

The aqueous film-forming coating composition of the present invention can be used as any of the waterborne compositions useful in coatings applications, particularly automotive applications. The aqueous coating composition of the present invention can be used as a monocoat, but preferably is used as a primer, colored base coat layer or transparent topcoat layer in a "color-plus-clear" coating system.

The aqueous coating composition of the present invention comprises one or more crosslinkable film-forming resins and one or more amphiphilic adjuvants, which will be discussed in detail below.

Useful crosslinkable film-forming resins include acrylic polymers, polyesters, including alkyds, polyurethanes, polyamides, polyethers and copolymers and mixtures thereof. These resins can be self-crosslinking or crosslinked by reaction with suitable crosslinking materials included in the coating composition.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

The acrylic copolymer can include hydroxyl functional groups which are often incorporated into the polymer by including one or more hydroxyl functional monomers in the reactants used to produce the copolymer. Useful hydroxyl functional monomers include hydroxyalkyl acrylates and methacrylates, preferably having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can be prepared with N-(alkoxymethyl)acrylamides and N-(alkoxymethyl) methacrylamides which result in self-crosslinking acrylic polymers.

Acrylic polymers can be prepared via aqueous emulsion polymerization techniques and used directly in the preparation of the aqueous coating composition, or via organic solution polymerization techniques with groups capable of salt formation such as acid or amine groups. Upon neutralization of these groups with a base or acid, the polymers can be dispersed into aqueous medium.

As discussed above, the crosslinkable film-forming resin can be an alkyd resin or a polyester. Such polymers can be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid. Besides the polycarboxylic acids mentioned above, functional equivalents of the acids such as anhydrides where they exist or lower alkyl esters of the acids such as methyl esters can be used. Where it is desired to produce air-drying alkyd resins, suitable drying oil fatty acids can be used and include those derived from linseed oil, soya bean oil, tall oil, dehydrated castor oil, or tung oil. The polyesters and alkyd resins contain a portion of free hydroxyl and/or carboxyl groups which are available for further crosslinking reactions.

Polyurethanes can also be used as the crosslinkable film-forming resin of the coating composition. Useful polyurethanes include polymeric polyols which are prepared by reacting polyester polyols or acrylic polyols, such as those mentioned above, with a polyisocyanate such that the OH/NCO equivalent ratio is greater than 1:1 so that free hydroxyl groups are present in the product.

The organic polyisocyanate which is used to prepare the polyurethane polyol can be an aliphatic or aromatic polyisocyanate or mixtures thereof. Diisocyanates are preferred, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates such as isophorone diisocyanate and 4,4'-methylene-bis-(cyclohexyl isocyanate) can be used. Examples of suitable higher polyisocyanates include 1,2,4-benzene triisocyanate and polymethylene polyphenyl isocyanate.

Usually the polyester and polyurethane are prepared with unreacted carboxylic acid groups, which upon neutralization with bases such as amines allows for dispersion into aqueous medium.

Other useful crosslinkable film-forming resins include polyamides, such as acrylamide, methacrylamide, N-alkylacrylamides and N-alkylmethacrylamides.

Generally, suitable crosslinkable film-forming resins have a weight average molecular weight greater than about 2000 grams per mole, preferably ranging from about 2000 to about 100,000 grams per mole (as determined by gel permeation chromatography using a polystyrene standard), and a hydroxyl equivalent weight ranging from about 400 to about 4000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The crosslinkable film-forming resin can have an acid value ranging from about 5 to about 100 mg KOH/g resin, and preferably about 20 to about 100 mg KOH/g resin. The acid value (number of milligrams of KOH per gram of solid required to neutralize the acid functionality in the resin) is a measure of the amount of acid functionality in the resin.

Waterborne coating compositions are disclosed in U.S. Pat. No. 4,403,003 (incorporated by reference herein), and the polymeric resinous compositions used in preparing these compositions can be used as the crosslinkable film-forming resin in the practice of this invention. Also, water-based polyurethanes such as those prepared in accordance with U.S. Pat. No. 4,147,679 (incorporated by reference herein) can be used as the crosslinkable film-forming resin in the coating composition of the present invention.

When the aqueous coating composition of the present invention is to be used as a basecoat in a color-plus-clear composite coating, the crosslinkable film-forming resin is preferably an aqueous dispersion of a blend of acrylic and polyester and/or polyurethane materials in microparticulate form. Such dispersions can be produced by a high stress technique using a homogenizer as described in U.S. Pat. No. 5,071,904, incorporated by reference herein. In this technique, the polymeric film-forming resin is a latex which comprises polymeric microparticles prepared by forming a mixture in aqueous medium of an ethylenically unsaturated monomer or mixture of ethylenically unsaturated monomers with a substantially hydrophobic polymer. The hydrophobic polymer is essentially free of repeating acrylic or vinyl units in the polymer backbone and has a molecular weight of greater than about 300 grams per mole. The hydrophobic polymer is preferably a polyester or polyurethane. The monomer(s) and hydrophobic polymer are particularized into microparticles by high stress techniques using a homogenizer followed by polymerizing the ethylenically unsaturated monomer(s) to form polymeric microparticles which are stably dispersed in the aqueous medium. These microparticles can be internally crosslinked so as to form microgels.

When the aqueous coating composition of the present invention is to be used as a waterborne clearcoat, the crosslinkable film-forming resin preferably comprises an acrylic polyol polymer. Such polymers can be prepared by polymerizing one or more ethylenically unsaturated beta-hydroxy ester functional monomers, one or more polymerizable ethylenically unsaturated, hydroxyalkyl functional monomers, and optionally one or more vinyl aromatic monomers, one or more alkyl esters of acrylic or methacrylic acid and at least one other ethylenically unsaturated monomer.

The beta-hydroxy ester functional monomer can be prepared from ethylenically unsaturated, epoxy functional monomers and saturated carboxylic acids having from about 13 to about 20 carbon atoms or ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of saturated carboxylic acids include saturated monocarboxylic acids such as isostearic acid and is not intended to exclude aromatic unsaturated carboxylic acids.

Useful ethylenically unsaturated acid functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation which would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

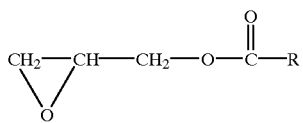

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polyol polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a "transcarbamoylation" reaction. Other useful carbamate functional monomers are disclosed in U.S. Pat. No. 5,098,947, which is incorporated herein by reference.

Polyethers, such as polypropylene glycol, can also be used as crosslinkable film-forming resins in clearcoat coating compositions of the present invention.

Generally, the crosslinkable film-forming resin is present in an amount ranging from about 25 to about 100 weight percent on a basis of total resin solids of the topcoat coating composition, preferably about 40 to about 95 weight percent and, more preferably, greater than 70 weight percent to about 90 weight percent. When the coating composition of the present invention is to be used as a clearcoat with an acrylic film-forming resin, it is preferred that the acrylic film-forming resin be present in an amount greater than 70 weight percent to about 95 weight percent on a basis of total resin solids of the aqueous coating composition.

The aqueous coating composition can further comprise one or more crosslinking materials capable of reacting with the crosslinkable film-forming resin to form a crosslinked film. The crosslinking material can be present as a mixture with the other components of the aqueous coating composition (conventionally referred to as a one-pack system), or in a separate composition which is mixed with the crosslinkable film-forming resin within a few hours prior to application of the coating composition to the substrate (conventionally referred to as a two-pack system).

Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are substantially alkylated with methanol or butanol.

The polyisocyanate which is utilized as a crosslinking agent can be prepared from a variety of isocyanate-containing materials. Preferably the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols also can be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Polyacid crosslinking materials suitable for use in the present invention on average generally contain greater than one acid group per molecule, more preferably three or more and most preferably four or more acid groups. Preferred polyacid crosslinking materials have di-, tri- or higher functionalities. Suitable polyacid crosslinking materials which can be used include carboxylic acid group-containing oligomers, polymers and compounds, such as acrylic polymers, polyesters, and polyurethanes and compounds having phosphorus-based acid groups.

Examples of suitable polyacid crosslinking materials include ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers are described in U.S. Pat. No. 4,764,430, column 4, line 26 to column 5, line 68, which is incorporated herein by reference.

Other useful crosslinking materials include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

Generally, the crosslinking material is present in an amount ranging from about 5 to about 50 weight percent on a basis of total resin solids of the aqueous coating composition, preferably about 10 to about 30 weight percent and, more preferably, about 10 to about 20 weight percent.

In an important aspect of the present invention, the aqueous coating composition comprises one or more amphiphilic adjuvants. The amphiphilic adjuvant has a water-soluble, generally hydrophilic polar end and a water-insoluble, generally hydrophobic hydrocarbon end.

The adjuvant can be present as a compound consisting of a single molecular species, oligomer or polymer, but preferably is an oligomer having a number average molecular weight ranging from about 200 to about 3000 grams per mole, and more preferably about 300 to about 800 grams per mole, as determined by gel permeation chromatography using polystyrene as a standard.

The adjuvant is preferably essentially free of acid functionality, i.e., it has an acid value of less than 30 mg KOH/g adjuvant, preferably less than about 20 mg KOH/g adjuvant, more preferably less than about 10 mg KOH/g adjuvant, and most preferably less than about 5 mg KOH/g adjuvant.

The adjuvant has one or more hydrophilic terminal hydroxyl groups positioned at its water-soluble polar end, although pendant hydroxyl functional groups can be present along the backbone of the adjuvant. Preferably, the hydrocarbon end of the adjuvant is free of hydroxyl functional groups. Generally, the adjuvant has a hydroxyl value which is greater than about 100 mg KOH/g of adjuvant, preferably ranges from about 100 to about 300 mg KOH/g, and more preferably about 150 to about 250 mg KOH/g.

As mentioned above, the adjuvant comprises a water-soluble, hydrophilic polar end which has one or more, and preferably an average of one to about three, terminal hydroxyl groups. The polar end of the adjuvant can further comprise one or more hydrophilic terminal groups, such as carbamate groups, amide groups, urea groups, mercaptan groups, mixtures and combinations thereof. One or more or combinations of these groups can be present as pendant functional groups along the backbone of the adjuvant.

The hydrocarbon end of the adjuvant can be a pendant or terminal end group, but preferably is a terminal end group positioned generally opposite to the water-soluble polar end of the adjuvant. The hydrocarbon end of the adjuvant comprises at least seven contiguous carbon atoms, preferably in a linear hydrocarbon chain. In a preferred embodiment, the hydrocarbon end includes 7 to about 24 contiguous carbon atoms, and more preferably 7 to about 18 contiguous carbon atoms. Preferably, the hydrocarbon end of the adjuvant is free of hydrophilic functional groups.

The adjuvant can be saturated or unsaturated, but preferably it is at least substantially saturated along the hydrocarbon chain. The adjuvant can be branched or unbranched, and can include functional groups such ester groups and/or ether groups and/or other functional groups containing nitrogen, oxygen, or sulfur. Preferably such functional groups are not positioned near the hydrophobic end.

In a preferred embodiment, the adjuvant is prepared by esterification of reactants comprising one or more monocarboxylic acids and one or more polyols, preferably in a 1:1 molar ratio. Suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof. Useful polyols include 1,4-butanediol, 1,6-hexanediol, neopentyl glycol, ethylene glycol, diethylene glycol, 2,3-butylene glycol, glycerol, trimethylolpropane, ditrimethylolpropane, pentaerythritol, sorbitol, mannitol and mixtures thereof. The polyol can include terminal groups such as short chain alkyl groups having 1 to 4 carbon atoms or amido groups.

Non-limiting examples of adjuvants prepared by the above esterification reaction include trimethylolpropane monoisostearate, di-trimethylolpropane isostearate, pentaerythritol isostearate and pentaerythritol diisostearate.

Additional reactants can be included in the reaction, such as one or more polycarboxylic acids, polyfunctional amines, polyfunctional isocyanates and mixtures thereof. Useful polycarboxylic acids include 1,4-cyclohexane dicarboxylic acid, dimer fatty acids, and other carboxylic acids such as are disclosed in U.S. Pat. No. 5,468,802 at column 2, lines 49–65 which are incorporated by reference herein. A useful mixture of isomers of 1,4-cyclohexane dicarboxylic acid is commercially available as EASTMAN® 1,4-CHDA from Eastman Kodak. For preparing a reaction product of isostearic acid, trimethylolpropane and 1,4-cyclohexane dicarboxylic acid, a high purity grade of EASTMAN® 1,4-CHDA having approximately 80:20 cis:trans isomers is preferred, although the "R" grade having 60:40 cis:trans also can be used. An example of a suitable adjuvant prepared by the above reaction using an polyfunctional amine instead of a polycarboxylic acid is stearyl diethanolamide.

Generally, if present, the polycarboxylic acid is present as an additional reactant in an amount of less than about 50 weight percent on a basis of total weight of the reactants from which the adjuvant reaction product is prepared, preferably less than about 30 weight percent and, more preferably, less than about 20 weight percent.

The esterification reaction is carried out in accordance with techniques which are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat.

No. 5,468,802 at column 3, lines 4–20 and 39–45, which are incorporated by reference herein.

Alternatively, the adjuvant can be prepared from the reaction of one or more polycarboxylic acids, one or more polyols and one or more hydrocarbon alcohols comprising at least seven contiguous carbon atoms in a manner well known to one skilled in the art. An example of this reaction is the formation of an oligomeric ester from phthalic anhydride, pentaerythritol and stearyl alcohol. Suitable polycarboxylic acids and polyols are discussed above. Useful hydrocarbon alcohols include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and isomers and mixtures thereof.

In another alternative embodiment, the adjuvant can be prepared by reacting one or more amines comprising at least seven contiguous carbon atoms and one or more reactants selected from carbonates or polycarboxylic acids and polyols in a manner well known to the skilled artisan. A non-limiting example is the reaction product of stearyl amine with glycerin carbonate to form N-stearyl dihydroxypropyl carbamate. Another example is the oligoamide-ester reaction product of stearyl amine with isophthalic acid and pentaerythritol. Useful amines include heptyl amine, octyl amine, pelargonyl amine, n-decyl amine, n-undecyl amine, lauryl amine, myristyl amine, cetyl amine, margyryl amine, stearyl amine, n-nonadecyl amine, arachidyl amine, and isomers and mixtures thereof. Suitable polycarboxylic acids and polyols are discussed above.

In yet another alternative embodiment, the adjuvant can be prepared by reacting one or more monocarboxylic acids with one or more epoxides, such as the glycidyl ether of versatic acid or glycidol, in a manner well known to one skilled in the art. A non-limiting example of an adjuvant prepared according to this reaction is the reaction product of isostearic acid and glycidol. Useful monocarboxylic acids are discussed above.

The adjuvant of the present invention can be added to the topcoat coating composition neat; that is, it is added by itself or in other resinous ingredients, or with solvents or other diluents.

Generally, the adjuvant is present in an amount ranging from about 0.01 to about 25 weight percent on a basis of total resin solids of the topcoat coating composition, preferably about 0.1 to about 20 weight percent and, more preferably, about 0.1 to about 15 weight percent.

If desired, the coating composition can comprise other optional materials well known in the art of formulated surface coatings, such as surfactants, flow control agents, thixotropic agents such as bentonite clay, fillers, anti-gassing agents, organic cosolvents, catalysts, including phosphonic acids and other customary auxiliaries. These materials can constitute up to 40 percent by weight of the total weight of the coating composition.

When the coating composition of the present invention is used as a waterborne monocoat or basecoat, it preferably contains pigments or dyes to give it color. In general, the pigment is incorporated into the coating composition in amounts of about 1 to 80 percent, and usually about 1 to 30 percent by weight based on total weight of the coating composition. Color pigments conventionally used in surface coatings include inorganic pigments such as titanium dioxide, iron oxide, chromium oxide, lead chromate, and carbon black; and organic pigments such as phthalocyanine blue and phthalocyanine green. Metallic flake pigments are also useful in waterborne compositions of the present invention. Suitable metallic pigments include aluminum flake, copper bronze flake and metal oxide coated mica. Aluminum flake is preferred.

The solids content of the aqueous coating composition generally ranges from about 10 to about 80 weight percent on a basis of total weight of the aqueous coating composition, and preferably about 15 to about 60 weight percent.

Preferably, the aqueous coating compositions of the present invention are used as primers, basecoats or clearcoats in a multi-component composite coating composition, such as a color-plus-clear composite coating. A color-plus-clear composite coating typically comprises a basecoat deposited from a pigmented or colored film-forming composition and a transparent or clear topcoat applied over the basecoat.

Coating compositions of the present invention can be applied to various substrates to which they adhere, including wood, metals, glass, cloth, polymeric substrates and the like. They are particularly useful for coating metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 80 percent. The coating composition of the present invention is particularly advantageous when applied at an ambient relative humidity ranging from about 30 to about 60 percent, yielding very smooth finishes.

When used as a primer, monocoat or basecoat, a film of the coating is formed on the substrate during application of the coating composition to the substrate. Typically, the coating thickness ranges from about 0.1 to about 5 mils (about 2.54 to about 127 microns), and preferably about 0.4 to about 1.5 mils (about 10.16 to about 38.1 microns) in thickness.

After application of the waterborne coating to the substrate, a film is formed on the surface of the substrate by driving water out of the film by heating or by an air-drying period. When the coating composition of the present invention is used as a basecoat, the heating will preferably be only for a short period of time and will be sufficient to ensure that a topcoat such as a clear coat can be applied to the coating if desired without the former dissolving the base coat composition. Suitable drying conditions will depend on the particular base coat composition and on the ambient humidity, but in general a drying time of from about 1 to 30 minutes at a temperature of about 80–250° F. (20–121° C.), preferably about 66–121° C., will be adequate to ensure that mixing of the two coats is minimized. At the same time, the basecoat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes.

After application of the coating composition as a basecoat, a topcoat is applied. The topcoat can be waterborne (preferred), solventborne or powdered. Preferably the topcoat coating composition is a crosslinkable coating comprising at least one thermosettable film-forming material and at least one crosslinking material. Suitable waterborne clearcoats are disclosed in U.S. Pat. No. 5,098,947 (incorporated by reference herein) and are based on water soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats are described in U.S. Pat. No. 5,663,240 (incorporated by reference herein) and include epoxy functional acrylic copolymers and polycarboxylic acid crosslinking agents. Preferably, the topcoat coating composition is chemically different or contains different relative amounts of ingredients from the basecoat coating composition, although the topcoat coating composition can be the same as the basecoat coating composition but without the pigments.

Alternatively, the coating composition of the present invention can be used as a monocoat or as a topcoat coating composition over a conventional basecoat which includes crosslinkable film-forming resins, crosslinkers and pigments such as are discussed above and in U.S. Pat. No. 5,071,904, which is incorporated herein by reference.

The topcoat coating composition can be applied to the surface of the basecoat by any of the coating processes discussed above for applying the basecoat coating composition to the substrate. The coated substrate is then heated to cure the coating layers.

In the curing operation, solvents are driven off and the film-forming materials of the clearcoat and the basecoat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clearcoat usually ranges from about 0.5 to about 5 mils (about 12.7 to about 127 microns), preferably about 1.2 to about 3 mils (about 30.48 to about 76.2 microns).

Another aspect of the present invention is a method for increasing the surface tension of a basecoat in a multi-component composite coating composition in which the surface tension of the basecoat coating composition is less than the surface tension of the topcoat coating composition to be applied over it. This method is particularly useful in basecoat/clearcoat systems in which the difference in surface tension between the basecoat coating composition and the topcoat coating composition is greater than about 10 dynes/centimeter. The method comprises the steps of depositing an aqueous basecoat coating composition including at least one crosslinkable film-forming resin and at least one crosslinking material capable of reacting with the film-forming resin to form a crosslinked basecoat and applying a topcoat coating composition over the basecoat to form a transparent topcoat thereon. The improvement comprises including the amphiphilic adjuvant discussed above in the basecoat coating composition in an amount ranging from about 0.01 to about 25 weight percent on a basis of total resin solids of the basecoat coating composition. By including the adjuvant in the basecoat, the surface tension of the basecoat can be raised to improve compatibility with the surface tension of the topcoat coating composition, thereby improving wettability of the topcoat coating composition on the surface of the basecoat, which can improve smoothness of the resulting composite coating.

The present invention will further be described by reference to the following examples. The following examples are merely illustrative of the invention and are not intended to be limiting. Unless otherwise indicated, all parts are by weight.

EXAMPLE

Adjuvant Example 1

An oligoester (CHDA/TMP/ISA, molar ratio 1/2/1, theoretical hydroxyl equivalent weight=223) was prepared in a fourneck round bottom flask equipped with a thermometer, mechanical stirrer, condenser, dry nitrogen sparge and a heating mantle. The same equipment was used to prepare each of Adjuvant Examples 1–14 below. The following ingredients were used:

| | |
|---|---|
| 1491.0 g | isostearic acid (ISA) |
| 1407.0 g | trimethylolpropane (TMP) |
| 903.0 g | 1,4 cyclohexanedicarboxylic acid (CHDA) |
| 7.6 g | dibutyltin oxide (DBTO) |
| 7.6 g | triphenyl phosphite (TPP) |
| 264.0 g | butyl glycol |

The first five ingredients were stirred in the flask at 210° C. until 270 ml of distillate was collected and the acid value dropped to 2.0. The material was cooled to 80° C. and the last ingredient was added. The final product was a liquid having a Gardner-Holdt viscosity of Z3-Z4, an $M_N$ of 1167 (measured by gel permeation chromatography using a polystyrene standard), an $M_W$ of 1911, and a non-volatile content of 89.5% (measured at 110° C. for one hour).

Adjuvant Example 2

An oligoester (CHDA/TMP/ISA, molar ratio 1/1.8211.65, theoretical hydroxyl equivalent weight=450) was prepared from the following ingredients:

| | |
|---|---|
| 2000.0 g | isostearic acid (ISA) |
| 943.0 g | trimethylolpropane (TMP) |
| 605.0 g | 1,4 cyclohexanedicarboxylic acid (CHDA) |
| 7.1 g | dibutyltin oxide (DBTO) |
| 7.1 g | triphenyl phosphite (TPP) |
| 824.0 g | butyl glycol |

The first five ingredients were stirred in the flask at 210° C. until 265 ml of distillate was collected and the acid value dropped to 1.7. The material was cooled to 80° C. and the last ingredient was added. The final product was a liquid having a Gardner-Holdt viscosity of R, an $M_N$ of 877, an $M_W$ of 2511, and a non-volatile content of 79.0%.

Adjuvant Example 3

An oligoester (CHDA/di-TMP/ISA, molar ratio 1/3.3812.28, theoretical hydroxyl equivalent weight=172) was prepared from the following ingredients:

| | |
|---|---|
| 1342.0 g | isostearic acid (ISA) |
| 1740.0 g | di-trimethylolpropane (di-TMP) |
| 355.0 g | 1,4 cyclohexanedicarboxylic acid (CHDA) |
| 3.4 g | dibutyltin oxide (DBTO) |
| 6.9 g | triphenyl phosphite (TPP) |
| 819.0 g | butyl glycol |

The first five ingredients were stirred in the flask at 210° C. until 140 ml of distillate was collected and the acid value dropped to 1.4. The material was cooled to 80° C. and the last ingredient was added. The final product was a liquid having a Gardner-Holdt viscosity of U, an $M_N$ of 1509, an $M_W$ of 2221, and a non-volatile content of 78.7%.

Adjuvant Example 4

An oligoester (CHDA/TMP/ISA, molar ratio 1/2/1, theoretical hydroxyl equivalent weight=215) was prepared from the following ingredients:

| | |
|---|---|
| 1400.0 g | isostearic acid (ISA) |
| 1321.0 g | trimethylolpropane (TMP) |
| 847.0 g | 1,4 cyclohexanedicarboxylic acid (CHDA) |
| 7.1 g | dibutyltin oxide (DBTO) |
| 7.1 g | triphenyl phosphite (TPP) |
| 826.0 g | butyl glycol |

The first five ingredients were stirred in the flask at 210° C. until 223 ml of distillate was collected and the acid value dropped to 18. The material was cooled to 80° C. and the last ingredient was added. The final product was a liquid having a Gardner-Holdt viscosity of U+, an $M_N$ of 976, an $M_W$ of 1418, and a non-volatile content of 77.0%.

Adjuvant Example 5

An oligoester (CHDA/TMP/ISA, molar ratio 1/2/1, theoretical hydroxyl equivalent weight=206) was prepared from the following ingredients:

| | |
|---|---|
| 1400.0 g | isostearic acid (ISA) |
| 1321.0 g | trimethylolpropane (TMP) |
| 847.0 g | 1,4 cyclohexanedicarboxylic acid (CHDA) |
| 7.1 g | dibutyltin oxide (DBTO) |
| 7.1 g | triphenyl phosphite (TPP) |
| 826.0 g | butyl glycol |

The first five ingredients were stirred in the flask at 150° C. to 180° C. until 192 ml of distillate was collected and the acid value dropped to 38. The material was cooled to 80° C. and the last ingredient was added. The final product was a liquid having a Gardner-Holdt viscosity of T+, an $M_N$ of 500, an $M_W$ of 982, and a non-volatile content of 74.0%.

Adjuvant Example 6

An oligoester (di-TMP/ISA, molar ratio 1/1, theoretical hydroxyl equivalent weight=172) was prepared from the following ingredients:

| | |
|---|---|
| 2005.0 g | isostearic acid (ISA) |
| 1762.0 g | di-trimethylolpropane (di-TMP) |
| 3.8 g | dibutyltin oxide (DBTO) |
| 7.5 g | triphenyl phosphite (TPP) |

All four ingredients were stirred in the flask at 230° C. until 110 ml of distillate was collected and the acid value dropped to 1.0. The final product was a semi-solid liquid with a hydroxyl value of 325, an $M_N$ of 683, an $M_w$ of 885, and a non-volatile content of 99.8%.

Adjuvant Example 7

An oligoester (di-TMP/ISA/dimer fatty acid, molar ratio 4/2/1, theoretical hydroxyl equivalent weight=173) was prepared from the following ingredients:

| | |
|---|---|
| 571.2 g | isostearic acid (ISA) |
| 571.2 g | dimer fatty acid (EMPOL 1008 available from Henkel Corporation) |
| 1000.0 g | di-trimethylolpropane (di-TMP) |
| 3.8 g | dibutyltin oxide (DBTO) |
| 7.5 g | triphenyl phosphite (TPP) |
| 2000.0 g | monomethyl ether of propylene glycol |

The first five ingredients were stirred in the flask at 230° C. until 62 ml of distillate was collected and the acid value dropped to 0.4. The material was cooled to 80° C. and the final material was added. The final product was a solution having a Gardner-Holdt viscosity of A, an $M_N$ of 1456, an $M_W$ of 2532, and a non-volatile content of 50.7%.

Adjuvant Example 8

An oligoester (di-TMP/stearic acid, molar ratio 1/1, theoretical hydroxyl equivalent weight=172) was prepared from the following ingredients:

| | |
|---|---|
| 2005.0 g | stearic acid (SA) |
| 1762.0 g | di-trimethylolpropane (di-TMP) |
| 3.8 g | dibutyltin oxide (DBTO) |
| 7.5 g | triphenyl phosphite (TPP) |

All four ingredients were stirred in the flask at 230° C. until 130 ml of distillate was collected and the acid value dropped to 1.3. The final product was a waxy solid having an $M_N$ of 961, an $M_W$ of 1056, and a non-volatile content of 99.8%.

Adjuvant Example 9

An oligoester (TEG/ISA, molar ratio 1/0.78, theoretical hydroxyl equivalent weight=329) was prepared from the following ingredients:

| | |
|---|---|
| 1713.0 g | isostearic acid (ISA) |
| 1165.0 g | tetra-ethylene glycol (TEG) |
| 1.5 g | dibutyltin oxide (DBTO) |
| 2.9 g | triphenyl phosphite (TPP) |

All four ingredients were stirred in the flask at 220° C. until 94 ml of distillate was collected and the acid value dropped to 1.2. The final product was a liquid having a Gardner-Holdt viscosity of B+, an $M_N$ of 746, an $M_W$ of 817, and a non-volatile content of 92.5%.

Adjuvant Example 10

An oligoester (pentaerythritol/ISA, molar ratio 1/1, theoretical hydroxyl equivalent weight=134) was prepared from the following ingredients:

| | |
|---|---|
| 2284.0 g | isostearic acid (ISA) |
| 1090.0 g | pentaerythritol |
| 1.7 g | dibutyltin oxide (DBTO) |
| 3.4 g | triphenyl phosphite (TPP) |

All four ingredients were stirred in the flask at 220° C. until 142 ml of distillate was collected and the acid value dropped to 1.0. The final product was a semi-solid liquid having an $M_N$ of 796, an $M_W$ of 1001, and a non-volatile content of 99.6%.

Adjuvant Example 11

An oligoester (TMP/isostearic acid, molar ratio 1/1, theoretical hydroxyl equivalent weight=200) was prepared from the following ingredients:

| | |
|---|---|
| 720.1 g | isostearic acid (ISA) |
| 335.3 g | trimethylolpropane (TMP) |
| 2.11 g | dibutyltin oxide (DBTO) |

The ingredients were stirred in the flask at 200° C. until the acid value dropped to 2.0. The final product was a liquid having a non-volatile content of 95.5%, a hydroxyl value of 274 and a free TMP content of 7.39%.

Adjuvant Example 12

An oligoester (di-TMP/glycidyl neodecanoate, molar ratio 1/1, theoretical hydroxyl equivalent weight=118) was prepared from the following ingredients:

| | |
|---|---|
| 963.5 g | di-trimethylolpropane (di-TMP) |
| 959.5 g | glycidyl neodecanoate (CARDURA E) |
| 1.92 g | stannous octoate |

The ingredients were stirred in the flask at 150° C. until the epoxy equivalent was greater than 13,000 glequiv. The final product was a liquid having an epoxy equivalent of 25,550, an $M_N$ of 558, an $M_W$ of 622, a hydroxyl value of 474 and a Brookfield viscosity of 232,000 cps (#5 at 3 rpm).

Adjuvant Example 13

This urethane (N-stearyl dihydroxypropyl carbamate, theoretical hydroxyl equivalent weight=194) was prepared from the following ingredients:

| | |
|---|---|
| 217.1 g | stearylamine |
| 94.8 g | glycerin carbonate |

The stearylamine was charged to the flask and heated to 75° C. The glycerin carbonate was then added to the melted stearylamine over an hour. The resulting reaction mixture was heated to 90° C. and stirred until the meq. amine/g was less than 0.15. The final product was a waxy solid having a hydroxyl value of 284.

Comparative Adjuvant Example 14

An oligoester (NPG/adipic acid, molar ratio 1.89/1, theoretical hydroxyl equivalent weight=172) was prepared from the following ingredients as a comparative example of a non-amphiphilic oligoester:

| | |
|---|---|
| 390.0 g | poly(neopentyl adipate), hydroxyl equivalent weight of 1000 (FORMREZ 55-112, commercially available from Witco, Inc.) |
| 110.7 g | neopentyl glycol (NPG) |

Both ingredients were stirred in the flask at 220° C. for one hour. The final product was a liquid having a Gardner-Holdt viscosity of X+, an OH value of 315, an acid value of 0.3, an $M_N$ of 796, an $M_W$ of 1001, and a non-volatile content of 86.4%.

Polyester Example 1

A polyester was prepared in a four-neck round bottom flask equipped with a thermometer, mechanical stirrer, condenser, dry nitrogen sparge, and a heating mantle. The following ingredients were used:

| | |
|---|---|
| 1728.0 g | stearic acid |
| 771.0 g | pentaerythritol |
| 455.0 g | crotonic acid |
| 659.0 g | phthalic anhydride |
| 7.8 g | dibutyltin oxide |
| 7.8 g | triphenyl phosphite |
| 800.0 g | butyl acrylate |

The first six ingredients were stirred in the flask at 230° C. until 292 ml of distillate was collected and the acid value dropped to 4.5. The material was cooled to 78° C. and the last ingredient was stirred in. The final product was a viscous yellow liquid having a Gardner-Holdt viscosity of X and a non-volatile content of 80.3%.

Polyester Example 2

An isostearate polyester was prepared using the same type of equipment as in Polyester Example 1 above and the following ingredients:

| | |
|---|---|
| 1103.0 g | isostearic acid |
| 800.0 g | pentaerythritol |
| 470.0 g | crotonic acid |
| 688.0 g | phthalic anhydride |
| 6.1 g | dibutyltin oxide |
| 6.1 g | triphenyl phosphite |
| 1170.0 g | butyl acrylate |
| 4.0 g | Ionol (butylated hydroxytoluene) |

The first six ingredients were stirred in the flask at 210° C. until 245 ml of distillate was collected and the acid value dropped to 4.6. The material was cooled to 77° C. and the last two ingredients were stirred in. The final product was a viscous yellow liquid having a hydroxyl vialue of 54.0, a Gardner-Holdt viscosity of Z+, a weight average molecular weight of 45,600, and a non-volatile content of 70.2%.

Latex Example 1

A pre-emulsion was prepared by stirring together the following ingredients:

| | |
|---|---|
| 250.0 g | Polyester Example 1 |
| 655.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The pre-emulsion was passed once through a MICROFLUIDIZER© M110T at 8000 psi and transferred to a four-neck round bottom flask equipped with an overhead stirrer, condenser, thermometer, and a nitrogen atmosphere. 150.0 g of water used to rinse the MICROFLUIDIZER© was added to the flask. The polymerization was initiated by adding 3.0 g of isoascorbic acid and 0.02 g of ferrous ammonium sulfate dissolved in 120.0 g water followed by a ten minute addition of 5.0 g of 70% t-butyl hydroperoxide dissolved in 115.0 g of water. The temperature of the reaction increased from 27° C. to 80° C. The temperature was reduced to less than 30° C. and 1.0 g of isoascorbic acid dissolved in 8.0 g water was added. Ten minutes later 17 g of 33.3% aqueous dimethylethanolamine was added followed by 2.0 g of Proxel GXL (Biocide available from ICI Americas, Inc.) in 8.0 g of water. The final pH of the latex was 6.2, the nonvolatile content was 41.0%, and the Brookfield viscosity was 12 cps (spindle #1,50 rpm).

Latex Example 2

A pre-emulsion was prepared by stirring together the following ingredients:

| | |
|---|---|
| 286.0 g | Polyester Example 2 |
| 664.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example 1. The reaction exothermed from 23° C. to 80° C. The final pH of the latex was 6.1, the nonvolatile content was 42.4%, the particle size was 105 nm, and the Brookfield viscosity was 14 cps (spindle #1,50 rpm).

Coating Examples 1–6

Aqueous silver metallic basecoat compositions for evaluation of the low molecular weight adjuvants were prepared in the following manner.

An aluminum pigment paste was prepared by mixing, in order under agitation, the components listed in "Premix A" shown in Table 1. The aluminum was allowed to stir for about 30 minutes until well dispersed. The premix was then used in Coating Examples 1–7 shown in Table 2.

TABLE 1

| Premix A | Parts by weight |
|---|---|
| Propylene glycol monobutyl ether | 796 |
| Ethylene glycol monobutyl ether | 160 |
| Stabilizer package[1] | 88 |
| SHELLSOL ® 071[2] | 80 |
| Phosphatized Epoxy[3] | 20 |
| RESIMENE ® 750[4] | 128 |
| CYMEL ® 327[5] | 112 |
| Aluminum paste[6] | 672 |
| 50% Aqueous DMEA | 40 |
| Deionized water | 800 |

[1]A blend of CYASORB ® UV-1164L, CYAGARD ® AO-177, CYAGARD ® AO-1790, all available from CYTEC Industries Inc., and SANDUVOR ® 3058, available from Sandoz Chemical Corp.
[2]Mineral spirits available from Shell Chemical Co.
[3]Phosphatized epoxy prepared from EPON ® 828, a polyglycidyl ether of Bisphenol A, available from Shell Chemical Co.; reacted with phosphoric acid at an 83:17 weight ratio.
[4]Partially butylated melamine resin available from Monsanto Co.
[5]Partially methylated melamine resin available from CYTEC Industries, Inc.
[6]STAPA HYDROLUX ® 600, a chromated aluminum paste available from Eckart Metal Powders and Pigments.

Silver basecoat examples 1–6 were prepared by mixing the aqueous resins and polyester examples with Premix A, as shown in Table 2. Using an appropriate amount of a 50% aqueous dimethylethanolamine solution, the pH of the coatings was adjusted to 8.6 to 8.7. The coatings were then reduced to a spray viscosity of 24 to 26 seconds (#4 Ford Cup) with deionized water.

TABLE 2

| | EX 1 | EX 2 | EX 3 | EX 4 | EX 5 | EX 6 |
|---|---|---|---|---|---|---|
| Premix A | 290 | 290 | 290 | 290 | 290 | 290 |
| Latex Ex. 2 | 320 | 284 | 284 | 284 | 284 | 284 |
| Polyurethane dispersion[7] | 115 | 72.6 | 72.6 | 72.6 | 72.6 | 72.6 |
| Adjuvant Ex. 1 | — | 33.4 | — | — | — | — |
| Adjuvant Ex. 2 | — | — | 38 | — | — | — |
| Adjuvant Ex. 3 | — | — | — | 38 | — | — |
| Adjuvant Ex. 4 (A.V. = 18) | — | — | — | — | 40 | — |
| Adjuvant Ex. 5 (A.V. = 38) | — | — | — | — | — | 40.5 |
| Neutralized acid polyester[8] | 17.4 | 17.4 | 17.4 | 17.4 | 17.4 | 17.4 |
| Deionized water | 40 | 150 | 182 | 125 | 85 | 140 |

[7]WITCOBOND ® W-242 available from Witco Corp.
[8]Neutralized solution of acid functional polyester prepared according to U.S. Pat. No. 5,356,973, Example A. Polyester blended with deionized water and 50% DMEA in a 2:4:1 ratio.

The pigmented coating examples from Table 2 were evaluated as follows. ACT cold roll steel panels ("4×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F.

The basecoat compositions from Table 2 were spray applied (two coats automated spray with 30 seconds ambient flash between coats) at 60% relative humidity and 70° F. to give a dry film thickness of 0.4 to 0.6 mils. The panels were flash baked for 10 minutes at 80° C. (176° F.). The panels were then topcoated with a commercially available two component isocyanate clearcoat, coded 40431 from Herberts GmbH, to give a dry film thickness of 1.7 mils. The finished panels were evaluated for appearance and the results are shown in Table 3.

TABLE 3

| | EX 1 | EX 2 | EX 3 | EX 4 | EX 5 | EX 6 |
|---|---|---|---|---|---|---|
| 20° Gloss[9] | 90 | 89 | 91 | 90 | 89 | 88 |
| DOI[10] | 90 | 91 | 91 | 91 | 85 | 91 |
| Byk Wavescan[11] | | | | | | |
| Longwave | 3.3 | 2.3 | 1.7 | 1.6 | 3.5 | 2.4 |
| Shortwave | 15.8 | 9.9 | 10.4 | 10.5 | 9.0 | 9.7 |
| Flip-flop[12] | 1.47 | 1.44 | 1.51 | 1.50 | 1.26 | 1.38 |

[9]Specular gloss reading measured at a 20° angle with a Novo Gloss Statistical Glossmeter from Gardco, where higher numbers indicate better performance.
[10]Distinction of Image (DOI) was measured by Hunter Lab's Dorigon II, where higher numbers indicate better performance.
[11]The coatings of examples 1–6 were tested to determine the relative smoothness of the coatings. The smoothness was determined using a wave scan plus instrument commercially available from BYK-Gardner GmbH. The instrument optically scans the wavy, light dark pattern on the surface over a distance of 10 cm (4 in) and detects the reflected light intensity point by point. The measured optical profile is divided into long-term waviness (structure size 0.6–10 mm) and short-term waviness (structure size 0.1–0.6 mm). Wavy structures with sizes between 0.1 mm and 10 mm are considered as orange peel or microwaviness. Orange peel is observed as a wavy, light-dark pattern on a high gloss surface. The type of structures that can be seen is dependent on the observation distance: long-term waviness at distances of 2 to 3 m and short-term waviness at about 50 cm.
[12]Ratio of face and angular reflectance measured using an ALCOPE LMR-200 multiple angle reflectometer, where higher numbers show a greater face/flop difference.

The results presented in Table 3 indicate that the addition of the adjuvants with low acid values provide a smooth basecoat surface and good pigment orientation, whereas those with higher acid values tend to reduce overall metallic appearance.

Coating Examples 7 and 8

For coating examples 7 and 8, a waterborne ANTHRAZIT basecoat coded H16-142-7834Y from PPG Lacke GmbH was used. Example 7 is the formula, as is, and Example 8 includes 6% on total formula of the adjuvant of Example 6, which was reduced to 50% solids with ethylene glycol monobutyl ether. The basecoats were reduced to a spray viscosity of 100–120 mPascal seconds at a shear rate of 1000 sec$^{-1}$.

The basecoats were spray applied on 20 cm×60 cm primed steel panels to give a dry film thickness of 10–12 microns. The panels were then flash baked for 10 minutes at 80° C. A commercially available, two-component clearcoat coded 40431 from Herberts GmbH was spray applied to the panels in a wedge of increasing film thickness to give from about 5 microns at the low end to about 30 microns at the high end. The panels were evaluated by determining the approximate dry clearcoat film thickness where sufficient wetting or film continuity occurs.

The results showed that over the basecoat of Example 7, clearcoat film wetting began at about 16–18 microns, whereas over the basecoat of Example 8, clearcoat film wetting began at about 8–10 microns. This shows that the addition of the adjuvant to the formulation provides an improvement in clearcoat wetting over the basecoat.

Coating Examples 9–19

A silver metallic basecoat was prepared as follows. Components listed under "Organic Slurry" in Table 4 were added in order under agitation. After the aluminum pastes were added, the slurry was allowed to stir under high shear for 20–30 minutes before addition of the remaining components. In a separate container, components listed under "Aqueous Phase" were added in order under agitation. The "Organic Slurry" premix was then added under agitation to the "Organic Phase" and the mixture was allowed to stir for 10 minutes. The pH of the basecoat formula was adjusted to 8.6 with a 50% aqueous solution of dimethylethanolamine (DMEA).

TABLE 4

| Component | Parts by weight |
| --- | --- |
| Organic Slurry | |
| Ethylene glycol monobutyl ether | 110.0 |
| Ethylene glycol monohexyl ether | 327.0 |
| BYK 031[13] | 16.0 |
| Aluminum Paste[14] | 301.0 |
| TINUVIN 1130[15] | 30.0 |
| Phosphatized Epoxy[3] | 8.5 |
| CYMEL 327[5] | 222.0 |
| Aluminum Passivator[16] | 49.5 |
| 50% Aqueous DMEA | 11.0 |
| Aqueous Phase | |
| Latex[17] | 698.0 |
| Deionized water | 1250.0 |
| SHELLSOL® 071[2] | 100.0 |
| Polyurethane acrylic dispersion[18] | 802.2 |
| Acrylic dispersion EPL 6920[19] | 1227.0 |
| Ethylene glycol monohexyl ether | 110.0 |
| 50% Aqueous DMEA | 22.0 |

[13]Commercially available defoamer from Byk-Chemie.
[14]ALPATE 7670NS aluminum paste available from Toyo Aluminum.
[15]Substituted benzotriazole UV absorber available from CIBA Additives.
[16]Prepared according to U.S. Pat. No. 5,429,674, see Example 6.
[17]Prepared according to U.S. Pat. No. 5,510,148, see Example 1.
[18]Polyurethane/acrylic dispersion prepared as follows. A polyurethane prepolymer was prepared by blending dimethylolpropionic acid (34.9 parts); DESMODUR® W (140.3 parts available from Bayer Corp.); dimer isocyanate (81.3 parts, DDI 1410 available from Henkel Corp.); FORMREZ® 66-56 (199.5 parts available from Witco Corp.); MPEG 2000 (50.3 parts available from Union Carbide, Inc.); dibutyltin dilaurate (0.4 parts); and N-methyl pyrrolidone (130.2 parts) and heating at 90° C. until the NCO equivalent weight reached 1079. The prepolymer was cooled to 35° C. and methyl methacrylate (197.9 parts), butyl acrylate (136.8 parts), and ethylene glycol dimethacrylate (14.0 parts) were added, followed by N,N-dimethylethanolamine (23.2 parts). This mixture was dispersed into deionized water (2372.1 parts) containing diethylenetriamine (18.7 parts) at 40° C. over 20 minutes and was held at 40° C. for 15 minutes. The dispersion was passed through a MICROFLUIDIZER® emulsifier at 8000 psi and was then heated to 60° C. A solution of ammonium persulfate (1.28 parts) in deionized water (99.4 parts) was slowly added, and the temperature was adjusted to 80° C. and held for 30 minutes. The resulting polymer dispersion had a solids content of approximately 25 percent.
[19]Polyacrylic dispersion available from Akzo Nobel.

Coating examples 9–19 were prepared as follows. The adjuvants were post-added under agitation to the above mixture in the amounts shown in Table 5. The coatings were reduced to a viscosity of 34 to 37 seconds on a #4 DIN cup. The final pHs of the basecoats were 8.6 to 8.7. The solid portions of the adjuvant samples were approximately equal to 20% by weight of the solids of the remaining basecoat resins.

TABLE 5

| | Ex. 9 | Ex. 10 | Ex. 11 | Ex. 12 | Ex. 13 | Ex. 14 | Ex. 15 | Ex. 16 | Ex. 17 | Ex. 18 | Ex. 19 Comp. |
| --- | --- | --- | --- | --- | --- | --- | --- | --- | --- | --- | --- |
| Basecoat (Table 4) | 300 | 300 | 300 | 300 | 300 | 300 | 300 | 300 | 300 | 300 | 300 |
| Adjuvant 1 | — | 12.2 | — | — | — | — | — | — | — | — | — |
| Adjuvant 6 | — | — | 11.5 | — | — | — | — | — | — | — | — |
| Adjuvant 7 | — | — | — | 22.5 | — | — | — | — | — | — | — |
| Adjuvant 8 | — | — | — | — | 11.4 | — | — | — | — | — | — |
| Adjuvant 9 | — | — | — | — | — | 12.3 | — | — | — | — | — |
| Adjuvant 10 | — | — | — | — | — | — | 11.4 | — | — | — | — |
| Adjuvant 11 | — | — | — | — | — | — | — | 11.4 | — | — | — |
| Adjuvant 12 | — | — | — | — | — | — | — | — | 11.4 | — | — |

TABLE 5-continued

|  | Ex. 9 | Ex. 10 | Ex. 11 | Ex. 12 | Ex. 13 | Ex. 14 | Ex. 15 | Ex. 16 | Ex. 17 | Ex. 18 | Ex. 19 Comp. |
|---|---|---|---|---|---|---|---|---|---|---|---|
| Adjuvant 13[20] | — | — | — | — | — | — | — | — | — | 11.4 | — |
| Adjuvant 14 | — | — | — | — | — | — | — | — | — | — | 11.4 |
| Water | — | 33.6 | 33 | 23.5 | 22.3 | 47.4 | 29.3 | 37.5 | 59.5 | 0 | 58.8 |

[20]The coating containing adjuvant 13 solidified after mixing.

The coating examples from Table 5 were evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F. The basecoat compositions from Table 5 were spray applied (two coats automated spray with 30 seconds ambient flash between coats) at 60% relative humidity and 70° F. to give a dry film thickness of 0.4 to 0.6 mils. The panels were flash baked for 5 minutes at 80° C. (176° F.). The surface tension was then measured on one set of panels. Another set of panels was topcoated with a commercially available two component isocyanate clearcoat, coded 40431 from Herberts GmbH, to give a dry film thickness of 1.7 mils. The finished panels were evaluated for appearance, and the results are shown in Table 6. As shown in Table 6, addition of adjuvants generally increased surface tension and improved metallic appearance and/or smoothness relative to the basecoats containing no adjuvant (Ex. 9) or the comparative oligoester (Ex. 19).

TABLE 6

|  | Surface Tension[21] | Flop Index[22] | Longwave[11] | Shortwave[11] | Profilometer[23] |
|---|---|---|---|---|---|
| Ex. 9 | 43.3 | 12.05 | 2.5 | 13.5 | 29.3 |
| Ex. 10 | 43.9 | 12.19 |  |  |  |
| Ex. 11 | 64.9 | 12.38 | 2 | 12.5 | 19 |
| Ex. 12 | 65.9 | 11.84 | 2.3 | 11.6 | 23.3 |
| Ex. 13 | 68.2 | 12.33 | 1.8 | 13.8 | 19.3 |
| Ex. 14 | 72.3 | 12.99 | 1.8 | 13.5 | 20.3 |
| Ex. 15 | 72.3 | 12.67 | 1.8 | 11.2 | 20.3 |
| Ex. 16 | 61.3 | 12.84 | 2.3 | 14.4 | 22.7 |
| Ex. 17 | 57.2 | 13.24 | 3.2 | 12.8 | 24.3 |
| Ex. 18 | — | — | — | — | — |
| Ex. 19 (Comp.) | 42.9 | 12.3 | 2.2 | 13.1 | 23.7 |

[21]Calculated from the contact angles of drops of water and methyl iodide on the basecoat surface.
[22]Measurement corresponding to a ratio of specular versus angular reflectance obtained from an X-Rite MA68II Multi-angle spectrophotometer, where higher number indicate beller flop.
[23]Measurement of the surface roughness of the basecoat using a Smoothness rating in microinches obtained with a Taylor-Hobson Surtronic 3 profilometer, where lower numbers indicate a smoother surface.

Coating Examples 20–29

A silver metallic basecoat was prepared as follows. Components listed under "Organic Slurry" in Table 7 were added in order under agitation. After the aluminum pastes were added, the slurry was allowed to stir under high shear for 20–30 minutes before addition of the remaining components. In a separate container, components listed under "Aqueous Phase" were added in order under agitation. The "Organic Slurry" premix was then added under agitation to the "Organic Phase" and the mixture was allowed to stir for 10 minutes.

TABLE 7

| Component | Parts by weight |
|---|---|
| Organic Slurry |  |
| Di-ethylene glycol monobutyl ether | 1100.0 |
| Ethylene glycol monohexyl ether | 2280.0 |
| Polypropylene glycol[24] | 120.0 |
| TINUVIN 1130[15] | 30.0 |
| SHELLSOL ® 071[2] | 38.0 |
| Aluminum Passivator[16] | 59.0 |
| Phosphatized Epoxy[3] | 10.0 |
| Aluminum Paste[14] | 232.0 |
| CYMEL 322[5] | 240.0 |
| 50% Aqueous DMEA | 90.0 |
| Aqueous Phase |  |
| Latex Ex. 1 | 1093.2 |
| Polyurethane acrylic dispersion[18] | 615.0 |
| Neutralized acid polyester[8] | 125.0 |

[24]MW 425 available from ARCO Chemical Co.

Coating examples 20–29 were prepared as follows. The adjuvants were post-added under agitation to the above mixture in the amounts shown in Table 8. The coatings were reduced to a viscosity of 34 to 37 seconds on a #4 DIN cup. The pHs of the basecoats were adjusted to 8.6 to 8.7 by the addition of a 50% aqueous solution of dimethylethanolamine (DMEA). The solid portions of the adjuvant samples were approximately equal to 20% by weight of the solids of the remaining basecoat resins.

TABLE 8

|  | Ex. 20 | Ex. 21 | Ex. 22 | Ex. 23 | Ex. 24 | Ex. 25 | Ex. 26 | Ex. 27 | Ex. 28 | Ex. 29 comp. |
|---|---|---|---|---|---|---|---|---|---|---|
| Basecoat (Table 7) | 364 | 364 | 364 | 364 | 364 | 364 | 364 | 364 | 364 | 364 |
| Adjuvant 1 | — | 22.3 | — | — | — | — | — | — | — | — |
| Adjuvant 6 | — | — | 20.0 | — | — | — | — | — | — | — |
| Adjuvant 7 | — | — | — | 39.4 | — | — | — | — | — | — |

TABLE 8-continued

|  | Ex. 20 | Ex. 21 | Ex. 22 | Ex. 23 | Ex. 24 | Ex. 25 | Ex. 26 | Ex. 27 | Ex. 28 | Ex. 29 comp. |
|---|---|---|---|---|---|---|---|---|---|---|
| Adjuvant 8[25] | — | — | — | — | 20.0 | — | — | — | — | — |
| Adjuvant 9 | — | — | — | — | — | 21.6 | — | — | — | — |
| Adjuvant 10 | — | — | — | — | — | — | 20.0 | — | — | — |
| Adjuvant 11 | — | — | — | — | — | — | — | 20.0 | — | — |
| Adjuvant 12 | — | — | — | — | — | — | — | — | 20.0 | — |
| Adjuvant 14 | — | — | — | — | — | — | — | — | — | 20.0 |
| Water | 50 | 50 | — | 55 | — | — | — | — | — | — |
| 50% Aq. DMEA | 3.0 | 2.0 | 2.1 | 3.6 | 0 | 2.1 | 2.3 | 3.0 | 3.4 | 2.6 |

[25]The coating containing adjuvant 5 solidified after mixing.

The coating examples from Table 8 were evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F. The basecoat compositions from Table 5 were spray applied (two coats automated spray with 30 seconds ambient flash between coats) at 60% relative humidity and 70° F. to give a dry film thickness of 0.4 to 0.6 mils. The panels were flash baked for 5 minutes at 80° C. (176° F.). The surface tension was then measured on one set of panels. Another set of panels were topcoated with a commercially available two component isocyanate clearcoat, coded 40431 from Herberts GmbH, to give a dry film thickness of 1.7 mils. The finished panels were evaluated for appearance, and the results are shown in Table 9. As shown in Table 9, addition of adjuvants generally shows a slight increase in surface tension and improvement in metallic appearance and/or smoothness relative to the basecoats containing no adjuvant (Ex. 20) or the comparative oligoester (Ex. 29).

TABLE 9

|  | Surface Tension[21] | Flop Index[22] | Longwave[11] | Shortwave[11] | Profilometer[23] |
|---|---|---|---|---|---|
| Ex. 20 | 19.7 | 15.33 | 52.9 | 31.4 | 24.3 |
| Ex. 21 | 22.2 | 11.58 | 23.3 | 21.8 | 25.7 |
| Ex. 22 | 22.4 | 12.01 | 11.1 | 24.6 | 28.0 |
| Ex. 23 | 22.7 | 10.07 | 14.0 | 23.6 | 24.3 |
| Ex. 24 | — | — | — | — | — |
| Ex. 25 | 19.2 | 13.19 | 11.3 | 32.8 | 15.0 |
| Ex. 26 | 21.0 | 13.38 | 12.9 | 26.7 | 23.7 |
| Ex. 27 | 28.7 | 14.49 | 14.8 | 21.5 | 19.7 |
| Ex. 28 | 19.0 | 14.47 | 16.1 | 20.3 | 17.3 |
| Ex. 29 Comp. | 22.3 | 13.36 | 14.6 | 26.7 | 17.0 |

The coating compositions of the present invention, when used as basecoats in a basecoat/clearcoat composite coating, can provide one or more of the following advantages: good substrate wetting, enhanced wetting of the clearcoat over the basecoat, good popping resistance, pinholing resistance, smoothness, leveling, flip-flop, brilliance (metallic shades), humidity resistance, lower surface tension and pattern control.

When the coating compositions of the present invention are used as a clearcoat coating compositions, advantages can include crater resistance, leveling, workability, water soaking/delamination resistance, windshield adhesion and resistance to adverse environmental conditions such as acid etch resistance.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. An aqueous coating composition comprising:
   (a) at least one crosslinkable film-forming resin selected from the group consisting of:
      i. an aqueous dispersion of polymeric microparticles comprising one or more ethylenically unsaturated monomers polymerized in the presence of a polyurethane polymer,
      ii. acrylic polymers,
      iii. polyurethane polymers,
      iv. polyamide polymers, and
      v. polyether polymer and mixtures thereof;
   (b) at least one amphiphilic adjuvant having an acid value of less than 30 and being present in an amount ranging from about 0.01 to about 25 weight percent on a basis of total resin solids of the aqueous coating composition, said adjuvant selected from at least one of:
      i. the reaction product of isostearic acid, trimethylolpropane, and 1,4-cyclohexane dicarboxylic acid,
      ii. the reaction product of at least one polycarboxylic acid, at least one polyol and at least one hydrocarbon alcohol comprising at least seven contiguous atoms,
      iii. the reaction product of at least one amine comprising at least seven contiguous carbon atoms and at least one reactant selected from the group consisting of carbonates, and polycarboxylic acids and polyols, and
      iv. the reaction product of isostearic acid and glycidol, said adjuvant comprising:
         (a) a water-soluble polar end comprising at least one terminal hydroxyl group; and
         (b) a water insoluble hydrocarbon end comprising at least seven contiguous carbon atoms; and
   c. a crosslinker,
wherein the coating composition is characterized in that the film-forming resin and adjuvant are present in the aqueous medium.

2. The aqueous coating composition according to claim 1, wherein the aqueous coating composition is a primer coating composition.

3. The aqueous coating composition according to claim 1, wherein the aqueous coating composition is a basecoat coating composition over which a transparent topcoat is applied to form a multi-component composite coating composition.

4. The aqueous coating composition according to claim 1, wherein the aqueous coating composition is a topcoat film-forming composition applied over a basecoat to form a multi-component composite coating composition.

5. The aqueous coating composition according to claim 1, wherein the crosslinkable film-forming resin is an aqueous dispersion of polymeric microparticles prepared by polymerizing ethylenically unsaturated monomers in the presence of a substantially hydrophobic polymer selected from the group consisting of polyesters and polyurethanes.

6. The aqueous coating composition according to claim 1, wherein the crosslinkable film-forming resin is present in an amount ranging from about 25 to about 100 weight percent on a basis of total resin solids of the aqueous coating composition.

7. The aqueous coating composition according to claim 1, wherein the monocarboxylic acid is selected from the group consisting of heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof.

8. The aqueous coating composition according to claim 1, wherein the polyol is selected from the group consisting of 1,4-butanediol, 1,6-hexanediol, neopentyl glycol, ethylene glycol, diethylene glycol, 2,3-butylene glycol, glycerol, trimethylolpropane, ditrimethylolpropane, pentaerythritol, dipentaerythritol, sorbitol, mannitol and mixtures thereof.

9. The aqueous coating composition according to claim 1, wherein the reaction product is selected from the group consisting of trimethylolpropane monoisostearate, di-trimethyolpropane isostearate, pentaerythritol isostearate, pentaerythritol diisostearate and mixtures thereof.

10. The aqueous coating composition according to claim 1, wherein polycarboxylic acid is present as an additional reactant in an amount of less than about 50 weight percent on a basis of total weight of the reactants from which the adjuvant reaction product is prepared.

11. The aqueous coating composition according to claim 10, herein polycarboxylic acid is present in an amount of less than about 30 weight percent on a basis of total weight of the reactants from which the adjuvant reaction product is prepared.

12. An aqueous coating composition comprising:
a. at least one crosslinkable film-forming resin selected from the group consisting of:
  i. an aqueous dispersion of polymeric microparticles comprising one or more ethylenically unsaturated monomers polymerized in the presence of a polyurethane polymer,
  ii. acrylic polymers,
  iii. polyurethane polymers,
  iv. polyamide polymers, and
  v. polyether polymer and mixtures thereof;
b. stearyl diethanolamide present in an amount ranging from about 0.01 to about 25 weight percent on a basis of total resin solids of the aqueous coating composition; and
c. a crosslinker,
wherein the coating composition is characterized in that the film-forming resin and adjuvant are present in the aqueous medium.

13. The aqueous coating composition according to claim 1, wherein the reaction product is N-stearyl dihydroxypropyl carbamate.

14. The aqueous coating composition according to claim 1, wherein the adjuvant has an acid value of less than about 20.

15. The aqueous coating composition according to claim 14, wherein the adjuvant has an acid value of less than about 10.

16. The aqueous coating composition according to claim 15, wherein the adjuvant has an acid value of less than about 5.

17. The aqueous coating composition according to claim 1, wherein the adjuvant is substantially saturated.

18. The aqueous coating composition according to claim 1, wherein the polar end of the adjuvant has an average of one to about three terminal hydroxyl groups.

19. The aqueous coating composition according to claim 1, wherein the polar end of the adjuvant further comprises at least one hydrophilic terminal group selected from the group consisting of carbamate groups, amide groups and urea groups.

20. The aqueous coating composition according to claim 1, wherein the hydrocarbon end of the adjuvant comprises seven to twenty-four contiguous carbon atoms.

21. The aqueous coating composition according to claim 1, wherein the hydrocarbon end of the adjuvant comprises a linear chain comprising at least seven contiguous carbon atoms.

22. The aqueous coating composition according to claim 1, wherein the adjuvant is present in an amount ranging from about 0.1 to about 25 weight percent on a basis of total resin solids of the aqueous coating composition.

23. The aqueous coating composition according to claim 1, wherein the basecoat coating composition further comprises at least one crosslinking material capable of reacting with the film-forming resin to form a crosslinked film.

24. The aqueous coating composition according to claim 23, wherein the crosslinking material is present in an amount ranging from about 5 to about 50 weight percent on a basis of total resin solids of the aqueous coating composition.

25. The aqueous coating composition according to claim 23, wherein the crosslinking material is selected from the group consisting of aminoplasts, polyisocyanates, polyacids, anhydrides and mixtures thereof.

* * * * *